(12) United States Patent
Chandran (10) Patent No.: US 6,480,604 B1
(45) Date of Patent: Nov. 12, 2002

(54) BALANCED SPECTRUM LIMITER FOR TELEPHONE AND COMMUNICATION SYSTEMS AND PROTECTION MODULE INCORPORATING THE SAME

(75) Inventor: Prem G. Chandran, Nesconset, NY (US)

(73) Assignee: Porta Systems Corporation, Syosset, NY (US)

( * ) Notice: Subject to any disclaimer, the term of this patent is extended or adjusted under 35 U.S.C. 154(b) by 0 days.

(21) Appl. No.: 09/410,330

(22) Filed: Oct. 1, 1999

(51) Int. Cl.[7] .............................................. H01M 1/74
(52) U.S. Cl. ...................................... 379/416; 379/412
(58) Field of Search ................................ 379/416, 412

(56) References Cited

U.S. PATENT DOCUMENTS

| | | | |
|---|---|---|---|
| 3,973,224 A | 8/1976 | Gaule et al. | 333/12 |
| 4,021,759 A | 5/1977 | Campi | 333/182 |
| 4,259,705 A | 3/1981 | Stifter | 361/56 |
| 4,455,538 A * | 6/1984 | Kinzler | 333/167 |
| 4,554,504 A | 11/1985 | Dillon | 323/356 |
| 4,586,104 A | 4/1986 | Standler | 361/119 |
| 4,628,394 A | 12/1986 | Crosby et al. | 361/56 |
| 4,675,772 A | 6/1987 | Epstein | 361/56 |
| 4,698,721 A | 10/1987 | Warren | 361/110 |
| 4,703,386 A | 10/1987 | Speet et al. | 361/56 |
| 4,729,055 A * | 3/1988 | Dorival et al. | 361/119 |
| 4,751,607 A | 6/1988 | Smith | 361/119 |
| 4,823,383 A | 4/1989 | Cardot et al. | 379/412 |
| 4,845,580 A | 7/1989 | Kitchens | 361/113 |
| 4,887,180 A | 12/1989 | Climent et al. | 361/113 |
| 5,101,180 A | 3/1992 | Frey | 333/12 |
| 5,257,157 A | 10/1993 | Epstein | 361/111 |
| 5,392,188 A | 2/1995 | Epstein | 361/118 |
| 5,416,663 A | 5/1995 | Atkins | 361/119 |
| 5,513,059 A | 4/1996 | Atkins | 361/56 |
| 5,523,916 A * | 6/1996 | Kaczmarek | 361/119 |
| 5,650,908 A | 7/1997 | Stanton | 361/113 |
| 5,802,170 A | 9/1998 | Smith et al. | 379/412 |
| 5,905,623 A | 5/1999 | McCartney | 361/119 |

* cited by examiner

Primary Examiner—Forester W. Isen
Assistant Examiner—Donald L. Storm
(74) Attorney, Agent, or Firm—Hoffmann & Baron, LLP (57) ABSTRACT

A balanced spectrum limiter for limiting the frequency spectrum of signals transmitted through a telephone or communication system includes one or more filters and an energy surge protection circuit. Each filter includes a pair of inductors wound around a single core and a capacitor connected between the two inductors. The energy surge protection circuit can be any type of energy surge protection circuit known in the art. The range of frequencies which can be transmitted is determined by the filter. The filter is removably connected to the energy surge protection circuit so that filters of varying parameters may be easily interchanged.

6 Claims, 10 Drawing Sheets

BALANCED SPECTRUM LIMITER FOR TELEPHONE AND COMMUNICATION SYSTEMS AND PROTECTION MODULE INCORPORATING THE SAME

BACKGROUND OF THE INVENTION

1. Field of the Invention

This invention relates generally to protection modules for telephone lines and data communication systems, and more particularly relates to circuit arrangements for limiting the frequency spectrum of a transmitted signal on a balanced circuit for the purpose of controlling interference.

2. Description of the Prior Art

Telephone systems are designed with central switching stations to which telephone lines are connected. The central switching stations route the telephone calls placed by telephone service subscribers. To route the telephone calls, it is necessary to attach very expensive electronic equipment (e.g., switching networks) to the telephone lines. Energy surges, due to lightning, for example, on the telephone lines can damage the electronic equipment. In order to protect the electronic equipment, energy surge protection circuits are typically placed between the electronic equipment and the telephone lines.

Figure 1:
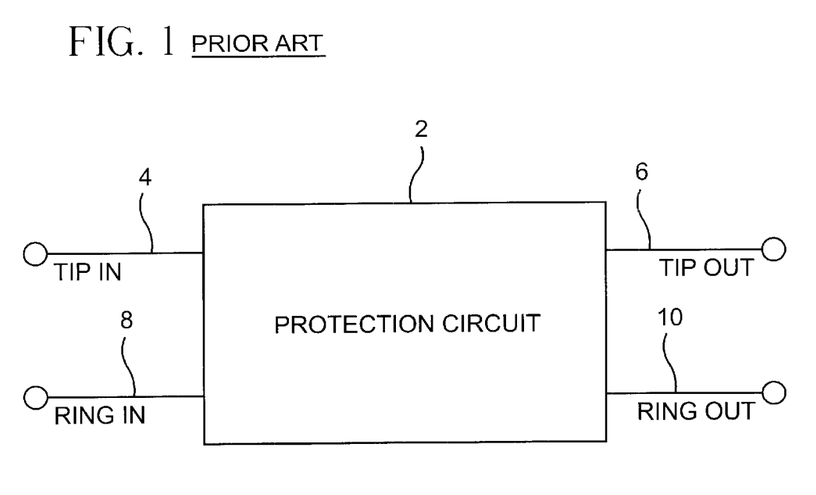
FIG. 1 is a functional block diagram of a conventional telephone system with an energy surge protection circuit placed between telephone transmission lines and a central switching station.

FIG. 1 illustrates a functional block diagram of a telephone system with an energy surge protection circuit. Prior art energy surge protection circuits have included fuses, semiconductor devices, heat coils, gas tubes, or combinations thereof. In FIG. 1, a protection circuit 2 is connected to transmission lines of a telephone or communication system including a tip input line 4, a tip output line 6, a ring input line 8, and a ring output line 10.

Figure 3:
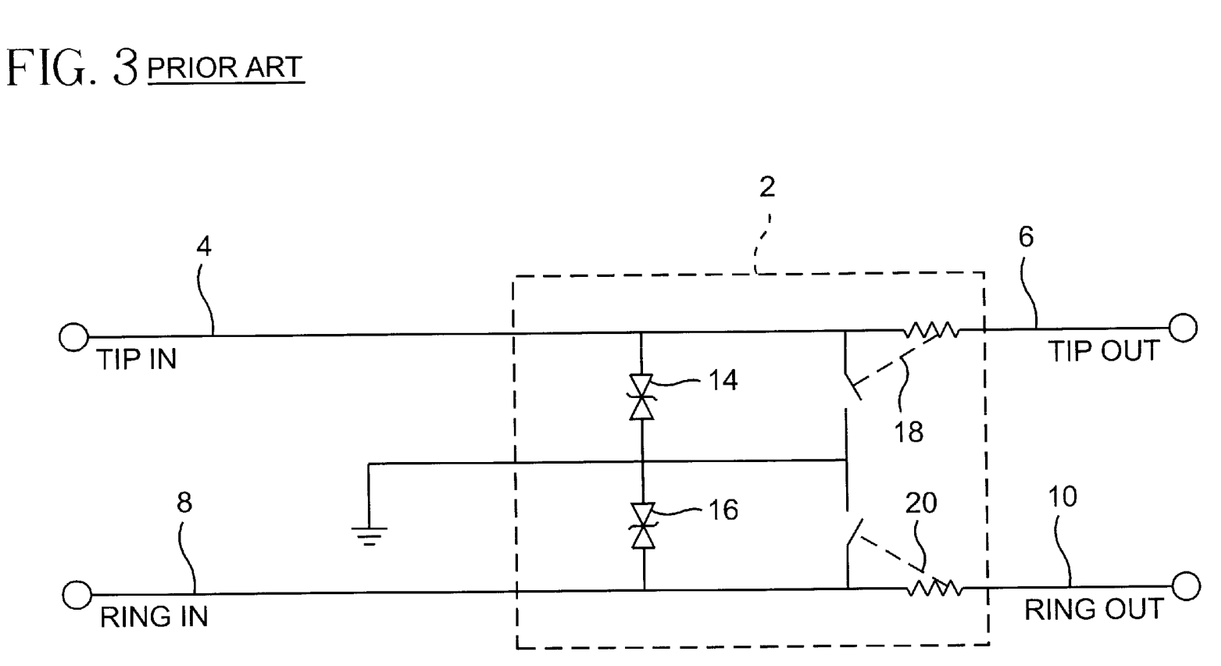
FIG. 3 is a schematic diagram of a prior art energy surge protection circuit.

A schematic diagram of the conventional prior art protection circuit shown in block form in FIG. 1 is illustrated in detail in FIG. 3. The circuit of FIG. 3 includes semiconductor devices 14, 16 and heat coils 18, 20 connected to the tip input line 4, the ring input line 8, and to ground. Semiconductor device 14 is connected between tip input line 4 and ground. Semiconductor device 16 is connected between ring input line 8 and ground. Heat coil 18 is connected between tip input line 4 and tip output line 6. Heat coil 20 is connected between ring input line 8 and ring output line 10. The semiconductor devices 14, 16 are typically avalanche type devices (e.g., diacs or transorbs). In the event there is an energy surge on the tip line or ring line, the semiconductor device begins sinking current and dissipates the energy surge by, effectively, shorting the tip line or ring line to ground. If, however, the semiconductor device malfunctions or the energy surge is of long duration, the heat coil begins to heat up as current passes through it. After the heat coil has risen to a predetermined temperature, the heat coil triggers a switch which shorts the respective tip line or ring line to ground, thereby further dissipating the energy surge.

Prior art protection circuits are concerned only with protecting electronic equipment from energy surges which occurred at a remote location and propagated through the telephone or data communication line. The prior art energy surge protection circuits are not capable of controlling the frequency signal that is transmitted over the telephone or data communication lines. As high speed transmissions become more popular and equipment that can transmit at frequencies above the intended operating frequency of a telephone or communication system become more prevalent, a problem has developed. Telephone service subscribers often attach high speed equipment to normal telephone lines. The high speed equipment operates at frequencies exceeding the intended operating frequency of the telephone or communication systems. This results in interference on the telephone line and reduced quality of performance. In a multi-channel system, the result is crosstalk. Crosstalk is interference on one channel caused by signals present on other channels.

Conventional circuits for controlling frequencies on a transmission line include various types of filters which are comprised of capacitors, inductors, semiconductor devices, or some combination thereof. These prior art circuits, however, are unbalanced (i.e., ground is used as a signal reference). Telephone lines must be balanced (i.e., the signal must be placed between the tip line and ring line, not the tip line and ground or the ring line and ground). Balanced lines have the advantage of providing improved noise immunity over unbalanced lines which are vulnerable to noise and transients.

None of the prior art circuits overcomes the problem of interference and crosstalk caused by a telephone service subscriber exceeding the intended operating frequency of the telephone system.

OBJECTS AND SUMMARY OF THE INVENTION

It is an object of the present invention to provide a spectrum limiting circuit which prevents telephone subscribers from exceeding a telephone or communication system's operating parameters.

It is another object of the present invention to provide a balanced spectrum limiting circuit for telephone and data communication systems.

It is a further object of the present invention to provide an apparatus which protects against energy surges on telephone and communication lines and limits the frequency spectrum of signals carried by the lines.

It is an even further object of the present invention to provide a modular design for a telephone and communication line protection module so that a spectrum limiting circuit housed therein may be easily changed for different bandwidths or frequencies of operation.

In accordance with one form of the present invention, a balanced spectrum limiter for use in a telephone or data communication system includes a first inductor wound around a first core and connected to the telephone tip line, a second inductor wound around the first core and connected to the telephone ring line, and a capacitor connected between the tip line and the ring line. Preferably, the first core is in the form of a toroid. The balanced spectrum limiter may also include a protection circuit having a first semiconductor device connected between the tip line and ground, a second semiconductor device connected between the ring line and ground, a first shunting device, such as a heat coil, connected to the tip line, the first inductor, and ground, and a second shunting device, which may also be a heat coil, connected to the ring line, the second inductor, and ground. The first and second shunting devices provide failsafe protection to the electronic equipment to which the transmission lines are connected. Should the duration of the energy surge be longer than what the semiconductor devices can dissipate without their failing, then the shunting devices heat up to a point where they short the tip or ring line to ground, thus dissipating the energy surge before it reaches and damages the electronic equipment.

A preferred embodiment of the present invention further includes a third inductor connected between the first inductor and a tip output line and wound around a second core, a fourth inductor connected between the second inductor and a ring output line and wound around the second core, and a second capacitor connected between the tip output line and the ring output line. Preferably, the second core has a closed magnetic path and an air gap, such as a pot core.

Preferably, the balanced spectrum limiter is removably connected to the protection circuit and can be easily interchanged with other limiter circuits having different bandwidths or center frequencies. The modular balanced spectrum limiter comprises a filter circuit removably connected in series to an energy surge protection circuit. The filter circuit and the energy surge protection circuit are contained in an openable housing. The openable housing is arranged to be received by a connection block thereby placing the filter circuit and the energy surge protection circuit in operable contact with a switching station network. The openable housing includes a body with a top opening and a bottom opening. A base is arranged to be removably attached to the body and close the bottom opening. A top cover is arranged to be removably attached to the body and close the top opening. A cap is arranged to be removably attached to the top cover. The cap contains the balanced spectrum limiting circuit having one or more filters.

The present invention also includes a method of frequency filtering a balanced signal including the steps of winding a twisted pair of conductors around a core thereby forming a pair of inductors, connecting a capacitor between the pair of inductors, receiving a balanced signal on the twisted pair of conductors, frequency filtering the balanced signal, and outputting the filtered balanced signal. The filtered balanced signal may then be put through a second filter to achieve greater frequency filtering.

These and other objects, features, and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 2:
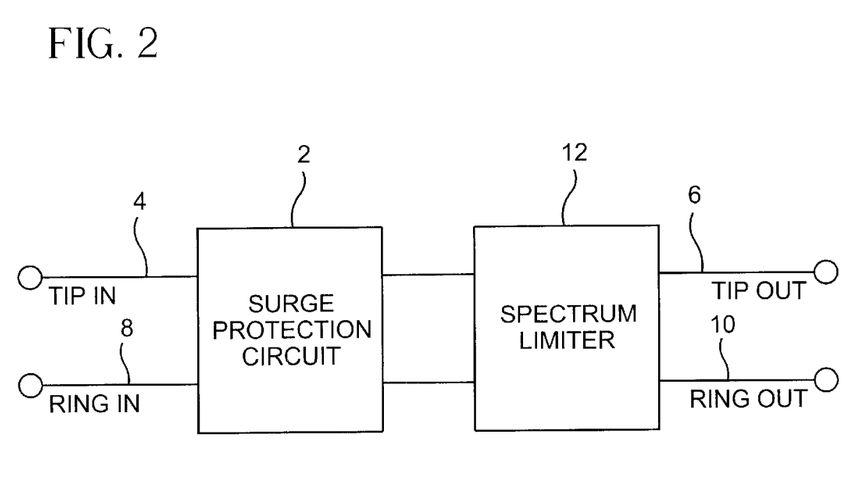
FIG. 2 is a functional block diagram of a telephone system with an energy surge protection circuit and spectrum limiter placed between telephone transmission lines and a central switching station.

In one form, the present invention relates to a circuit arrangement for limiting the frequency spectrum of a balanced circuit, such as in a telephone or communication system, for the purpose of controlling interference. A functional block diagram of a balanced circuit utilizing an energy surge protection circuit and a balanced spectrum limiter is illustrated in FIG. 2. The energy surge protection circuit 2 may be any surge protection circuit known in the art and is not limited to the energy surge protection circuit shown in FIG. 3. It is envisioned that a user will specify an energy surge protection circuit with particular parameters. The specified energy surge protection circuit will then be packaged with the spectrum limiter circuit. The spectrum limiter circuit 12 may be a single filter or multiple filters connected in series. A first embodiment of the filter is illustrated in FIG. 4.

Figure 4:
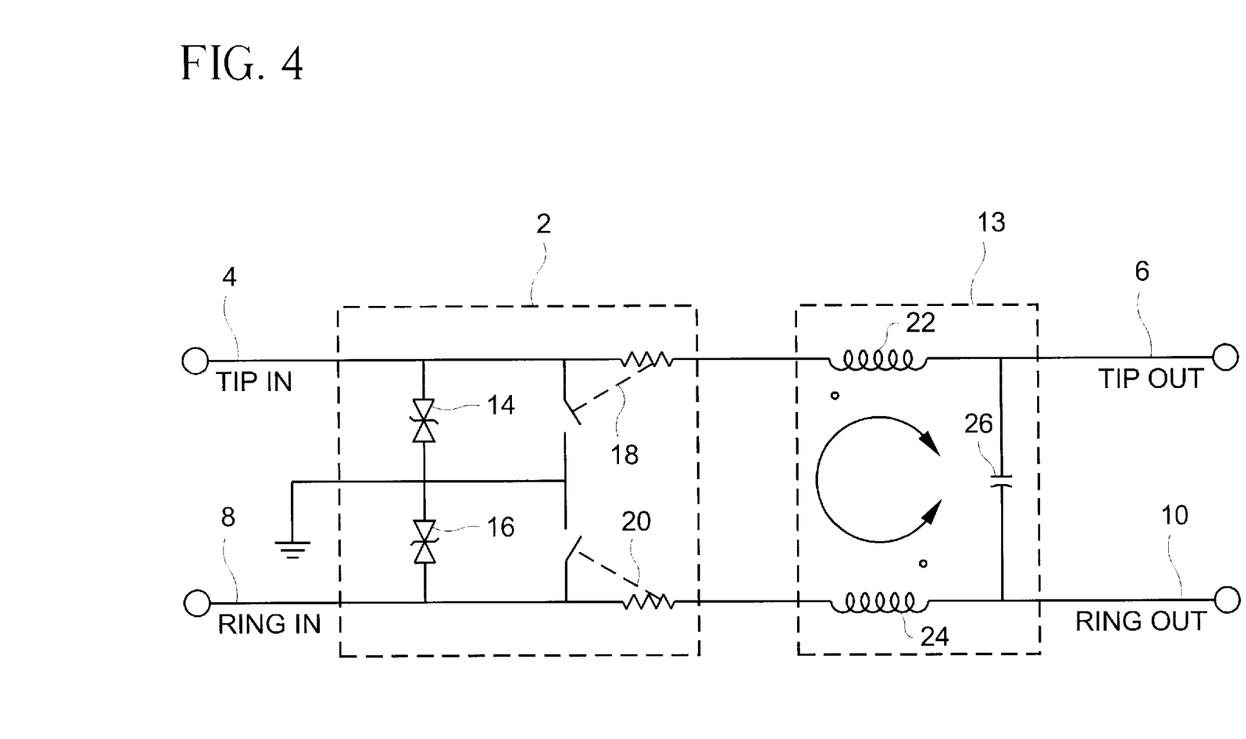
FIG. 4 is a schematic diagram of a balanced spectrum limiter and energy surge protection circuit formed in accordance with one form of the present invention.

FIG. 4 is a schematic diagram of the energy surge protection circuit 2 and a toroidal core filter 13. The energy surge protection circuit 2 includes breakdown diodes 14, 16 (such as zener or avalanche diodes, avalanche diodes being preferred) and shunting devices, such as heat coils 18, 20 and associated shunting switches. The toroidal core filter 13 includes inductors 22, 24 and a capacitor 26.

The avalanche diodes 14, 16 are selected to have a nominal breakdown voltage of 230 volts which is slightly above the maximum surge voltage normally expected to occur in the telephone or communication system. The heat coils 18, 20 which are well known in the art, include coils of resistive heating wire wound about a bobbin. The resistive heating wire carries the circuit current. An elastically-biased ground contact is fastened to the bobbin with a low melting point solder. When the temperature of the heat coil rises in response to circuit current, the ohmic heat generated in the coil melts the low melting point solder and the elastically-biased ground contact is free to short the tip line or ring line to ground. The circuit is symmetrical with respect to the tip line and ring line. Therefore, each line has equal protection against energy surges.

Referring again to FIG. 4, the avalanche diode 14 is connected between a tip input line 4 and ground. The avalanche diode 16 is connected between a ring input line 8 and ground. The heat coil 18 is connected in series with the tip input line 4 and is serially connected to the inductor 22. The heat coil 20 is connected to the ring input line 8 and is serially connected to the inductor 24. The capacitor 26 is connected between the inductors 22, 24 and is across a tip output line 6 and a ring output line 10. The heat coils 18, 20 and their associated shunting switches are arranged to cause a short to ground if the temperature of the heat coil rises to a predetermined level.

Preferably, the inductors 22, 24 are wound around the same core which is in the form of a toroid. By winding the inductors around the same core, the tip line and the ring line are naturally balanced over the entire frequency spectrum of operation. The balanced circuit provides superior noise immunity compared to its unbalanced equivalent. It is preferable that the inductors 22, 24 be formed by winding twisted pairs of wires around a soft ferrite toroid core. Accordingly, the inductors have a nearly identical value of inductance and are balanced.

The inductors 22, 24 and the capacitor 26 act as a filter. The filter 13 passes only signals which are in a predetermined frequency range. Preferably, the filter 13 will operate as a low pass filter with a cutoff frequency (i.e., the frequency at which the signal is sufficiently attenuated for the application) determined in accordance with the following equation:

$$f = \frac{1}{2\pi\sqrt{LC}} \qquad \text{Eq. 1}$$

where f is the cutoff frequency, L is the inductance of each of the inductors 22, 24, and C is the capacitance of the capacitor 26. Preferably, the cutoff frequency of the filter 13 is 40 kilohertz (KHz).

It is desirable to have the impedance of the filter circuit match the impedance of the telephone lines to minimize loss and reflections. The impedance of a lossless line is calculated in accordance with the following equation:

$$Z = \sqrt{\frac{L}{C}} \qquad \text{Eq. 2}$$

where Z is the impedance in ohms ($\Omega$), L is the inductance of each of the inductors 22, 24, and C is the capacitance of the capacitor 26. Preferably, the impedance of the filter will be 600$\Omega$, which is the standard impedance of a telephone system network. Some systems connected to telephone lines, however, have an impedance of 100$\Omega$. Therefore, the balanced spectrum limiter must be operable when connected to 600$\Omega$ loads and 100$\Omega$ loads. Using Equations 1 and 2, for a 600$\Omega$ telephone system, the capacitor 26 is calculated to be 6800 picofarads and the inductance of each inductor 22, 24 is calculated to be 2.5 millihenries (mH).

Preferably, the core of the toroid is selected to have a permeability of about 12,000. The number of turns of wire around the toroid that are necessary to obtain an inductor of a desired value can be calculated in accordance with the following equation:

$$n = \sqrt{\frac{L}{A_L}} \qquad \text{Eq. 3}$$

where n is the number of turns of wire around the toroid, $A_L$ is the permeability of the toroid, and L is the inductance of each of the inductors 22, 24 in henries. According to Equation 3, the inductors 22, 24 consist of fourteen (14) turns of wire around the toroid.

In operation, the tip input line 4 and the ring input line 8 are connected to the outside plant (i.e., a telephone subscriber's line). The tip output line 6 and the ring output line 10 are connected to switching circuitry at the central switching station of the telephone service provider. The surge protection part of the circuit will only be triggered if there is an energy surge. In normal operation (i.e., no energy surge), the filter 13 will only pass signals which are in a predetermined frequency range. Preferably, the filter will act as a low pass filter blocking all frequencies above about 40 KHz and passing all frequencies below about 40 KHz. As the frequency of the signal increases, the impedance of the inductors 22, 24 increases and the impedance of the capacitor 26 decreases. Accordingly, the signals with frequencies beyond the predetermined range will meet a high impedance from the inductors 22, 24 and a low impedance between the tip output line 6 and the ring output line 10. The result is a highly attenuated signal beyond the filter's cutoff frequency or bandpass. Thus, telephone subscribers can attach equipment to the system which exceed the system's normal operating frequency without adversely affecting the system. The equipment will not be able to transmit an interfering signal through the telephone network because all signals with frequencies beyond the range of the filter will be blocked. Accordingly, interference and crosstalk between telephone lines will be minimized or eliminated.

Figure 5:
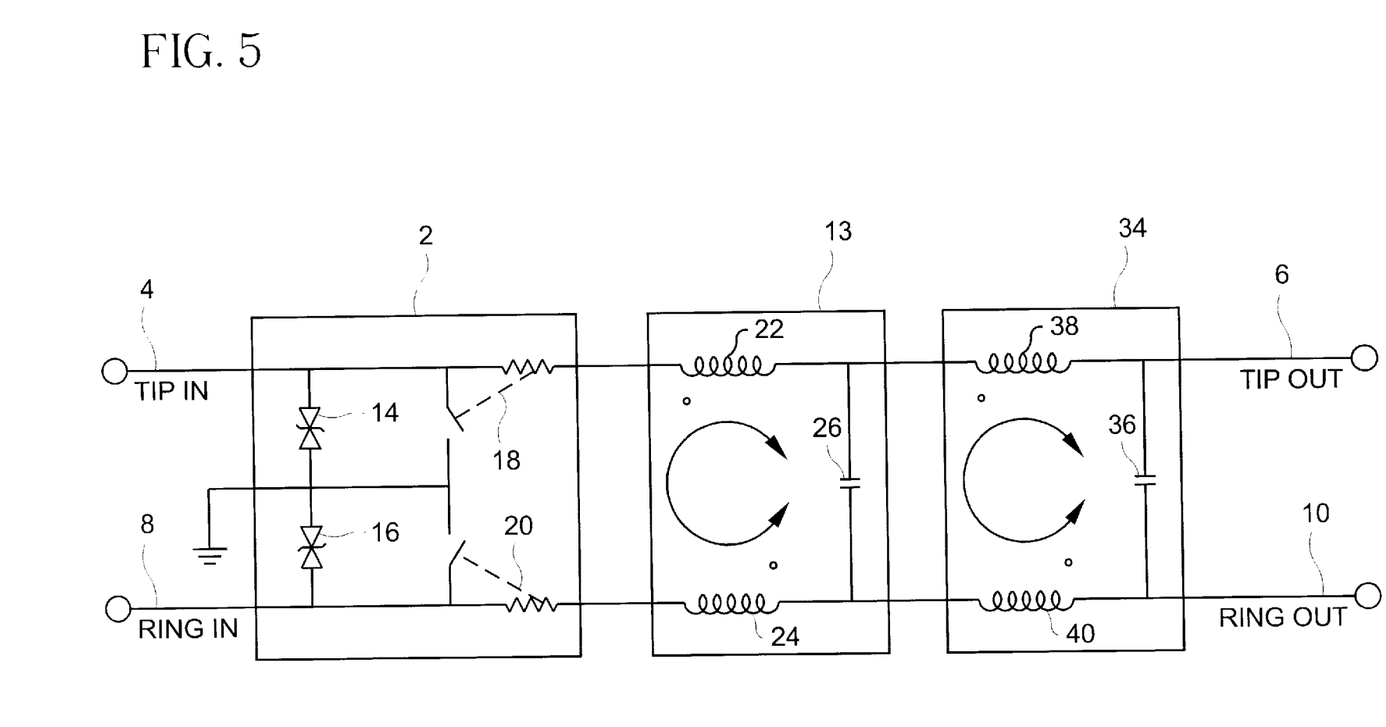
FIG. 5 is a schematic diagram of a balanced spectrum limiter and energy surge protection circuit formed in accordance with another form of the present invention.

In an alternative embodiment, the balanced spectrum limiter includes two filters connected in series (i.e., a dual filter arrangement). A schematic diagram of the dual filter arrangement is illustrated in FIG. 5. The circuit of FIG. 5 is identical to the circuit of FIG. 4 except for the addition of a second filter. Preferably, the dual filter includes a toroidal core filter 13 in series with a pot core filter 34. The inductors 22, 24 and capacitor 26 form the toroidal core filter 13. A pot core filter 34 is connected in series with the toroidal core filter 13. The pot core filter includes inductors 38, 40 and a capacitor 36. The inductor 38 is connected serially to inductor 22 and the inductor 40 is connected serially to inductor 24. The capacitor 36 is connected between inductors 38, 40. The inductors 38, 40 are formed by winding twisted pair wire around a pot core. A pot core is designed to have a closed magnetic path which results in containment of all of the magnetic flux generated from an excited winding. Pot cores have an air gap which allows the core to store higher levels of magnetic flux without reaching a saturation current. The saturation current is the level of current through an inductor which causes the resulting magnetic flux to exceed the maximum capabilities of the magnetic core. When the maximum levels of magnetic flux are reached, the permeability of the core is reduced and accordingly the inductance decreases. A decrease in inductance changes the cutoff frequency of the filter.

The embodiment shown in FIG. 5 requires a DC bias current through the pot core inductors. The air gap allows the inductors to pass the DC bias current without causing the core to reach the saturation current. Preferably, the pot core inductors 38, 40 are formed so that they can pass a current of 150 mA (milliamps) without saturating the magnetic core. If the magnetic core is saturated, the inductance of the inductors 38, 40 substantially decreases, thereby changing the cutoff frequency of the pot core filter. The dual filter offers increased attenuation of the signals having frequencies beyond the predetermined range resulting in a sharper roll-off (i.e., the attenuation of the signal is faster). The roll-off under a 600$\Omega$ load for the single filter circuit of FIG. 4 is about 5 dB per decade and for the dual filter circuit of FIG. 5 is about 10 dB per decade. In operation, the pot core filter 34 will function similarly to the toroid core filter 13.

Referring to FIGS. 4 and 5, the circuits preferably use as heat coils 18, 20, Part No. O556-32-3339 manufactured by Porta Systems of Syosset, New York; and as avalanche diodes 14, 16, Part No. 0000-41-1077 manufactured by Shinko Electric Industrial Company of Nagano-Shi, Japan. The avalanche diodes have a nominal breakdown voltage of 230 volts, and preferably have a DC breakdown voltage of between about 215 volts and about 265 volts and a maximum capacitance of about 100 picofarads at 50 volts. Preferably, the avalanche diodes will have copper and nickel electroplate electrodes with a thickness of between about 75 microinches and about 150 microinches. The circuits of FIGS. 4 and 5 also preferably use as capacitors 26, 36, Part No. 1210B562K501N manufactured by Novacap of Valencia, Calif., having a capacitance of between about 5600 picofarads and about 6800 picofarads; as the pot core in pot core inductors 38, 40, Part No. D-41408-31 manufactured by Magnetics of Butler, Pa.; as the toroid core in toroid core inductors 22, 24, Part No. H-40705-TC manufactured by Magnetics of Butler, Pa.; and as the conductors wound on the pot core and toroid core, Part No. N591-51H-2340 (twisted pair, 34 gauge) manufactured by Bridgeport Insulated Wire of Bridgeport, Conn.

Figure 6:
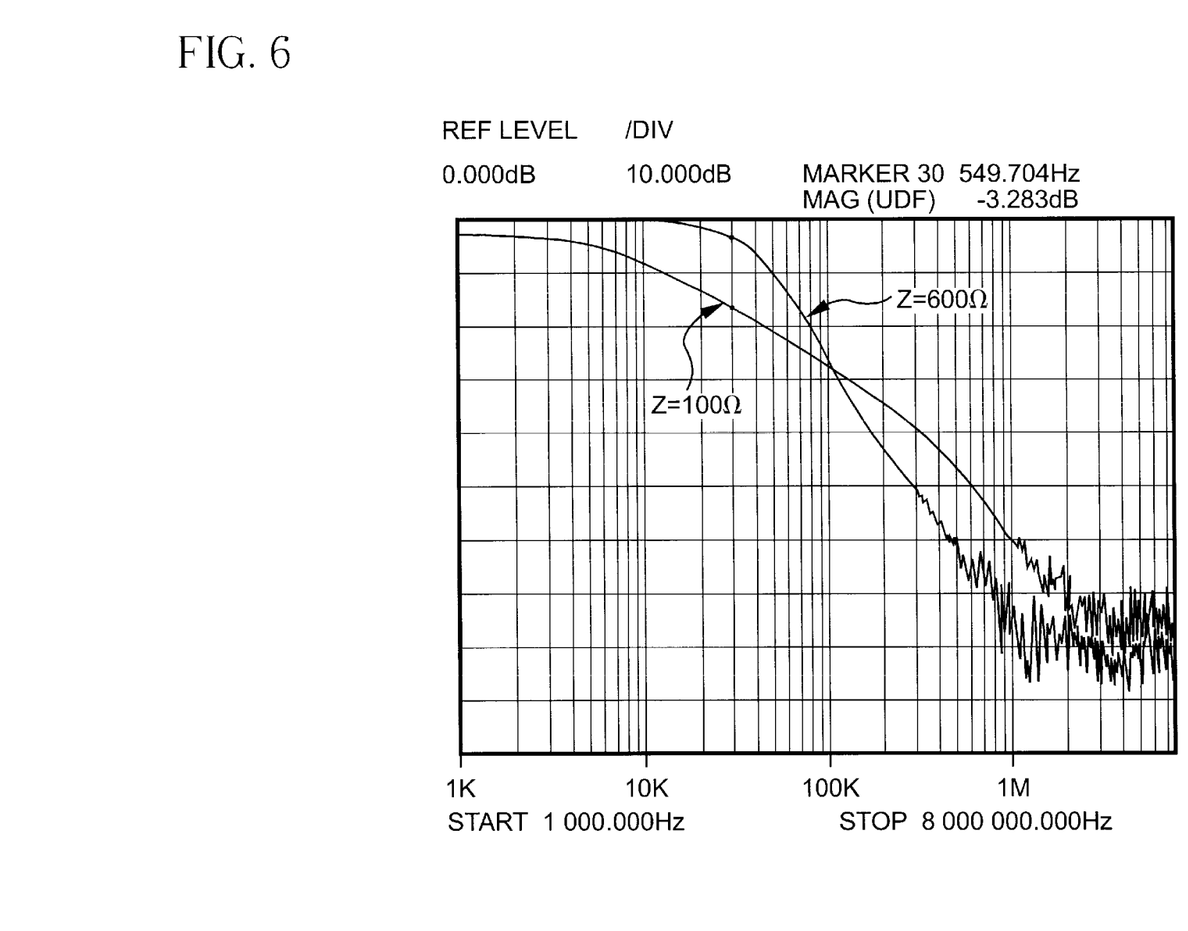
FIG. 6 is a graph of the power delivered to a load as a function of frequency for a toroid core filter formed in accordance with the present invention.

To facilitate an understanding of the filter circuit design, a graph of the power delivered to a load as a function of frequency is provided and depicted in FIG. 6. The graph shows two plots. The first plot is labeled Z=100Ω and represents the power delivered to a 100Ω load by the toroid filter 13 alone. At the preferred cutoff frequency of 40 KHz, the signal is attenuated by about 18 dB. The second plot is labeled Z=600Ω and represents the power delivered to a 600Ω load by the toroid filter 13 alone. At the preferred cutoff frequency of 40 KHz, the signal is attenuated by about 7 dB.

Figure 7:
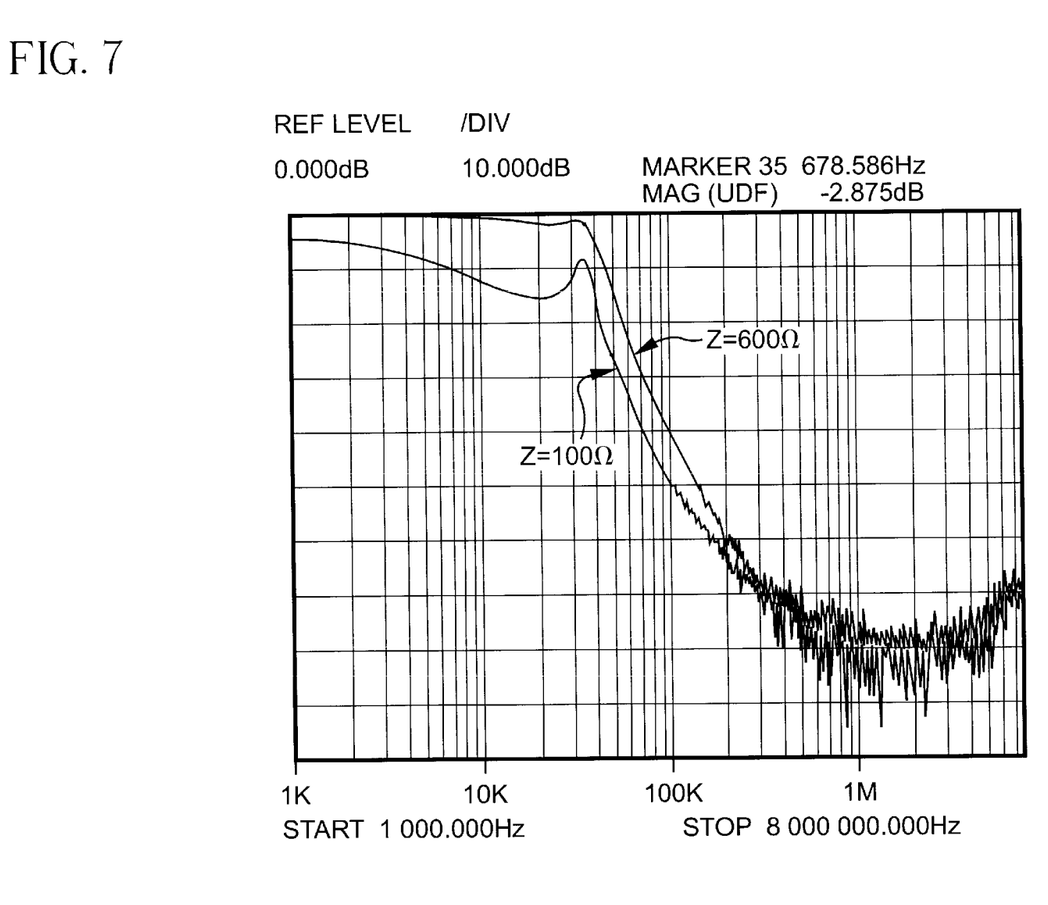
FIG. 7 is a graph of the power delivered to a load as a function of frequency for a toroid core filter in series with a pot core filter formed in accordance with the present invention.

A graph of power delivered as a function of frequency is depicted in FIG. 7 for a circuit comprising the toroid filter 13 connected in series to the pot core filter 34. The graph includes plots for a 100Ω load and a 600Ω load. At the preferred cutoff frequency of 40 KHz, the signal is attenuated by about 20 dB for the 100Ω load. The signal is attenuated by about 50 dB at 100 KHz for the 100Ω load. The signal for the 600Ω load is attenuated by about 7 dB at the preferred cutoff frequency of 40 KHz. The signal is attenuated by about 40 dB at 100 KHz for the 600Ω load. The power delivered to the loads is essentially identical when the energy surge protection circuit 2 is placed in series with the filters 13, 34.

Figure 8:
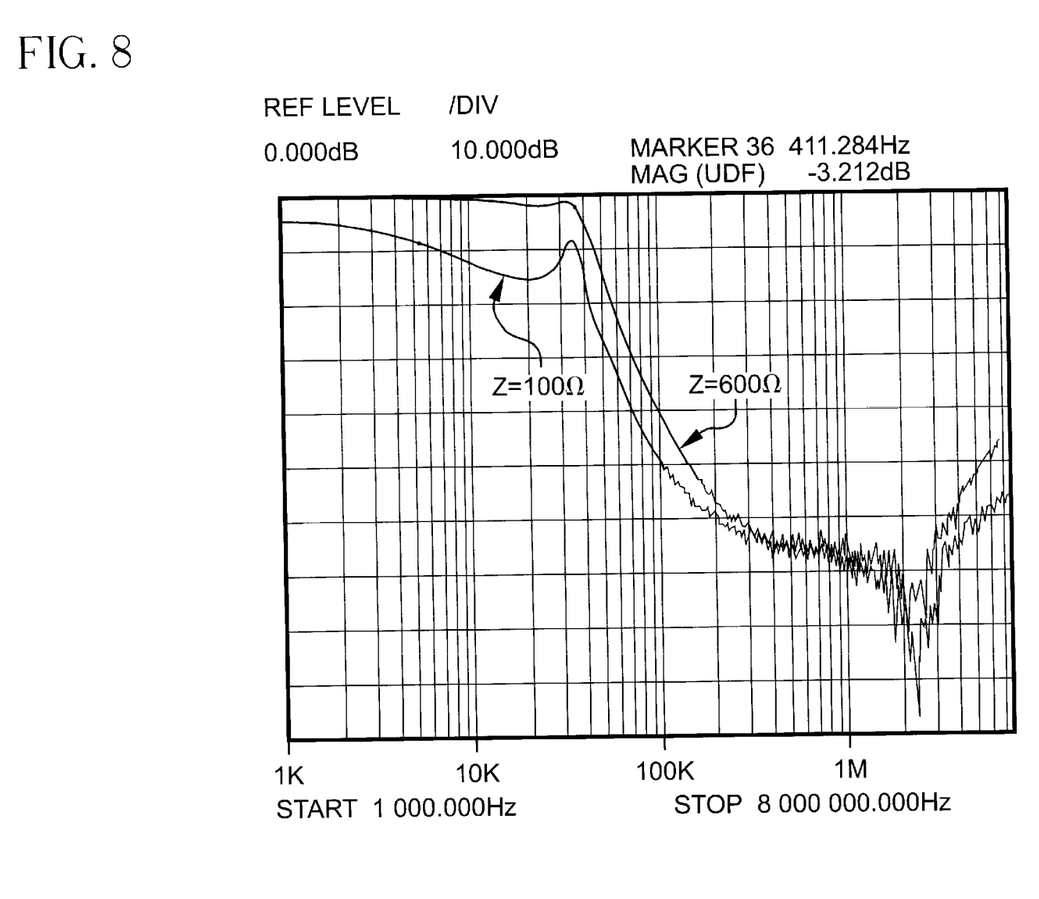
FIG. 8 is a graph of the power delivered to a load as a function of frequency for the circuit shown in FIG. 5.

A graph of power delivered as a function of frequency is depicted in FIG. 8 for the circuit shown in FIG. 5 (i.e., the energy surge protection circuit 2 in series with filters 13, 34). The graph includes plots for a 100Ω load and a 600Ω load. The signal for the 100Ω load is attenuated by about 20 dB at the preferred cutoff frequency of 40 KHz. The signal for the 100Ω load is attenuated by about 50 dB at 100 KHz. The signal for the 600Ω load is attenuated by about 7 dB at the preferred cutoff frequency of 40 KHz. The signal for the 600Ω load is attenuated by about 40 dB at 100 KHz.

Central switching stations for telephone or communication systems will have a large number of incoming transmission lines connected to a switching network. These transmission lines are connected to a series of connection blocks. Each connection block can receive a plurality of transmission lines. In addition, the connection block can receive a plug type device which, when inserted, results in a connection between the transmission lines and the switching network. Typically, energy surge protection circuits are plug type devices which can be inserted or removed from a switching network socket or receptacle easily. It is envisioned that the balanced spectrum limiter (i.e., the single balanced filter or dual balanced filter) will be included in a plug type device with the energy surge protection circuit. Insertion of the plug type device will result in a series connection of the incoming transmission line, energy surge protection circuit, balanced spectrum limiter, and central switching network. Preferably, the balanced spectrum limiter will be modular so that it may easily be changed. The modularity of the design allows filters of varying parameters to be interchanged easily.

Figure 9:
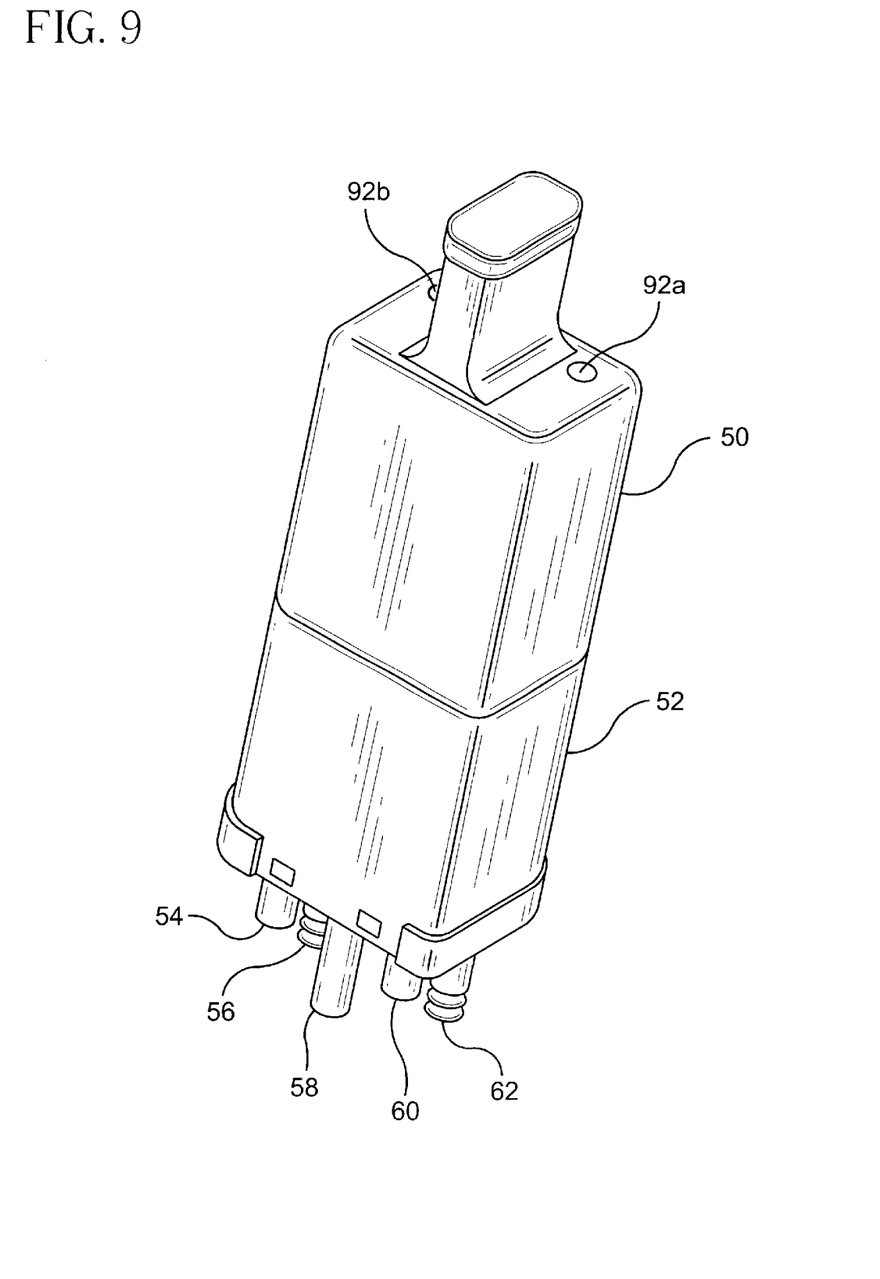
FIG. 9 is a pictorial diagram of an embodiment of a modular plug assembly housing the balanced spectrum limiter and energy surge protection circuit.

FIG. 9 illustrates one form of a plug assembly, which includes the energy surge protection circuit and the filter circuit. The plug assembly includes a housing formed of a cap 50 which snap fits together with a body 52. Preferably, the body 52 houses the energy surge protection circuit and the cap 50 houses the filter circuit. Preferably, the circuitry in the plug assembly will be in two distinct subassemblies.

Figure 10:
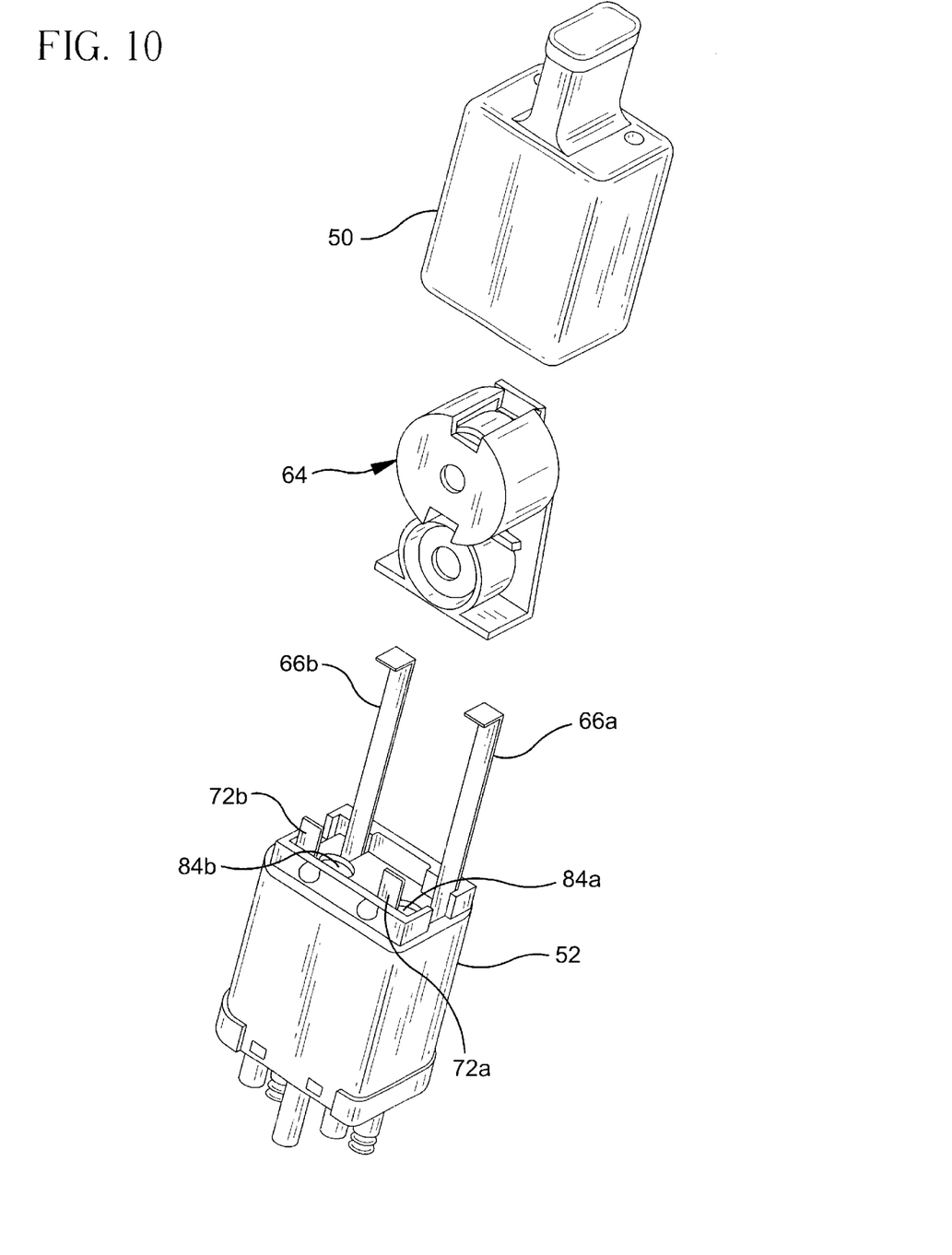
FIG. 10 is a partially exploded pictorial diagram of an embodiment of the modular plug assembly as illustrated in FIG. 9.
Figure 11:
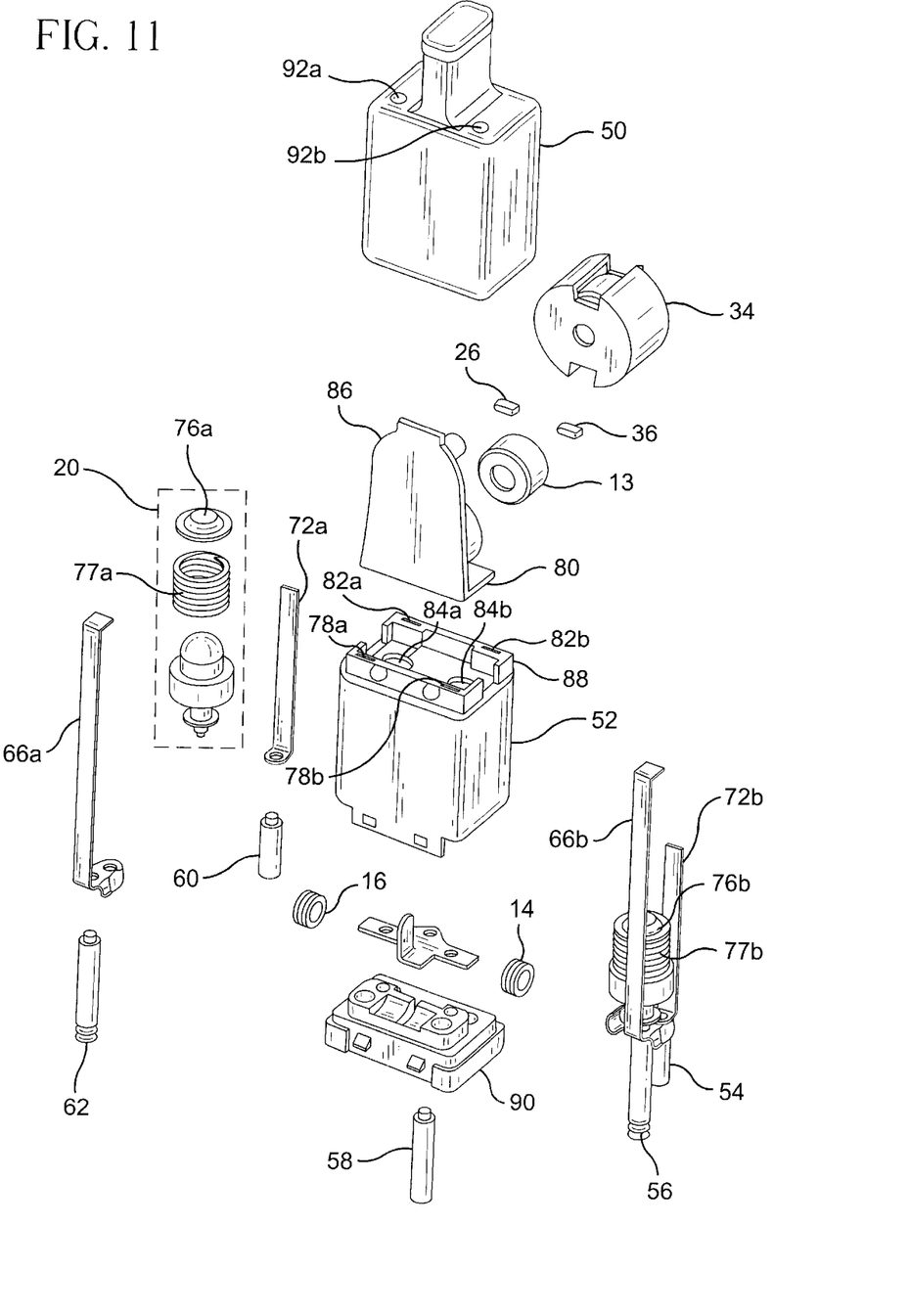
FIG. 11 is a fully exploded pictorial diagram of an embodiment of the modular plug assembly as illustrated in FIG. 9.

Referring to FIGS. 10 and 11, the plug assembly will be described in detail. A filter subassembly 64 will include all of the components of the single or dual filter. A protection subassembly will include all of the components of the energy surge protection circuit. Preferably, the filter subassembly 64 is mounted on an L-shaped filter holder 86. The interconnection of the inductors and capacitors of the filter subassembly are soldered together. The L-shaped filter holder 86 has two contact points (i.e., flat conductors) on an outside wall 80. One of the contact points is connected to inductor 22 and the other contact point is connected to inductor 24. The energy surge protection circuit is housed within the body 52. The body 52 has a top opening and a bottom opening.

The top opening is covered by top cover 88 and the bottom opening is covered by base 90. The base 90 defines five openings through which pins 54, 56, 58, 60, and 62 pass. The base 90 snap fits together with the body 52. The components of the energy surge protection circuit are soldered together and placed in the body 52. The energy surge protection circuit includes two avalanche diodes and two heat coils. The heat coils have contact buttons 76a, 76b mounted on springs. The contact buttons 76a, 76b extend through holes 84a, 84b which are defined by top cover 88. The through holes 84a, 84b correspond to the positions of the contact points on the L-shaped filter holder 86. In addition, the top cover 88 defines four slots 78a, 78b, 82a, 82b through which flat conductors pass.

The first flat conductor 72a passes through slot 82a and is connected at one end to the pin 60 and at the other end is removably connected to inductor 24 in the single filter circuit or inductor 40 in the dual filter circuit. The second flat conductor 72b passes through slot 82b and is connected at one end to the pin 54 and at the other end is removably connected to inductor 22 in the single filter circuit or inductor 38 in the dual filter circuit. The third flat conductor 66b passes through slot 78b and is connected at a proximal end to the pin 56. The fourth flat conductor 66a passes through slot 78a and is connected at a proximal end to the pin 62. The third and fourth flat conductors extend to openings 92a, 92b which are defined by the cap 50. Probes may be inserted through the two openings 92a, 92b to contact the distal ends of the third and fourth flat conductors. The probes are inserted to test the outside plant connection. The third and fourth flat conductors allow the plug assembly to be bypassed to test the outside plant connection without removing the plug assembly.

In operation the filter subassembly 64 is pushed down on the contact buttons 76a, 76b so that the contact points on the outside wall 80 of the L-shaped filter holder 86 form an electrical connection with their respective contact buttons 76a, 76b. A good electrical connection is obtained by compressing the heat coil springs 77a, 77b. The heat coil springs are retained in a compressed state by removably attaching the cap 50 to the body 52. The cap 50 holds the filter subassembly compressed in place. The first flat conductor 72a and the second flat conductor 72b are caused to bow away from the filter subassembly 64 when the L-shaped filter holder 86 is inserted. The resiliency of the conductors 72a, 72b results in pressure exerted by the conductors 72a, 72b on connection points to the appropriate inductors in the filter subassembly 64.

The dimensions of the plug assembly and pin locations extending from the plug assembly are standard and are well known in the art. Preferably, pins 56, 58, and 62 are longer than pins 54, 50 so that the plug assembly can be inserted into the connection block receptacle up to two discrete levels. The first level will result in the pins 56 and 62 being connected to the outside plant (i.e., the subscribers' telephone lines) and long pin 58 being connected to ground. When inserted in the connection block, pins 56 and 62 will connect to the tip input line 4 and ring input line 8, respectively. At the first level, the surge protection circuit and filter circuit are connected to the outside plant but the network is not connected to the outside plant. This allows central office equipment to be protected from energy surges without connecting the telephone line to the switching network. The second level of insertion results in a connection of the pins 54 and 60 to the central switching station network. The network receptacle is adapted to receive the pins and hold the plug assembly securely in place. The electronic equipment in the telephone network is thereby protected by the energy surge protection circuit and balanced spectrum limiter.

In an alternative embodiment, the plug assembly includes only the pin 58 which connects to ground. The remaining pins are replaced by sockets into which pins extending from the connection block are received. The pins extending from the connection block correspond in length to the pins of the five pin embodiment. The same setup is used in the single pin embodiment as in the five pin embodiment in which insertion of the long pins results in a partial connection and insertion of all the pins results in a full connection. Although it is advantageous to use the single pin embodiment because it is more cost effective, the five pin embodiment has become the standard in the United States and is used exclusively. The standard in Europe, however, is the single pin embodiment.

It is preferable that the filter subassembly 64 be attached to the plug assembly last during the manufacturing process. In this way, the partially complete plug assembly can be manufactured and stored until an order is placed. When a user places an order, the specific filter subassembly needed is inserted and the plug assembly is closed and packaged for delivery to the user.

FIG. 10 is an exploded view of the plug assembly in FIG. 9. The plug assembly is designed so that the spectrum limiter circuit can be removed and replaced easily with another spectrum limiter circuit having a different bandwidth or cutoff frequency. In operation, the plug assembly is inserted in a network receptacle where it protects against energy surges damaging the network and prevents any interference-causing signals from entering the network. If the heat coils in the energy surge protection circuitry fired, the plug assembly is easily replaced by pulling it out of the receptacle and placing in another plug assembly.

It is often desirable to replace just the filter with a different filter. This is done by disconnecting the cap 50 from the body 52 and changing the filter. Referring to FIG. 10, interchanging the filter subassembly 64 is accomplished by unsnapping the cap 50 and the body 52 to reveal the filter subassembly 64. The filter subassembly 64 is electrically connected to the heat coils 22, 24 by contact buttons 76a, 76b which are part of the heat coils and by flat conductors 72a, 72b to the pins 54, 60. When the cap 50 is secured in place, it forces the contact buttons 76a, 76b to electrically connect to the filter subassembly 64. Consequently, removing the cap 50 results in releasing the filter subassembly 64 from the electrical connections. The filter subassembly can be removed and replaced with another filter subassembly with different parameters. The cap 50 is then replaced which forces the filter subassembly 64 into place and into electrical connection with the contact buttons 76a, 76b. Preferably, the energy surge protection circuit will not be affected by changing the filter subassembly and no connections within the energy surge protection circuit will be altered.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A modular balanced spectrum limiter for frequency filtering a balanced signal on a telephone system's tip and ring lines comprising:

an energy surge protection circuit, the energy surge protection circuit arranged to receive a balanced signal from the tip line and the ring line;

a filter circuit removably connected in series to the energy surge protection circuit, the filter circuit frequency filtering the balanced signal; and an openable housing, the openable housing arranged to house the filter circuit and the energy surge protection circuit, the openable housing arranged to be received by a connection block thereby placing the filter circuit and the energy surge protection circuit in operable contact with a switching station network, the switching station network being responsive to the frequency filtered balanced signal, the openable housing including:

a) a body, the body having a top opening and a bottom opening;

b) a base, the base arranged to be removably attached to the body, the base closing the bottom opening when attached to the body, the energy surge protection circuit being housed in the body;

c) a top cover, the top cover arranged to be removably attached to the body, the top cover closing the top opening when attached to the body; and d) a cap, the cap arranged to be removably attached to the top cover, the filter circuit being housed in the cap.

2. A modular balanced spectrum limiter for frequency filtering a balanced signal on a telephone system's tip and ring lines as defined by claim 1, wherein the energy surge protection circuit comprises:

a) a first shunting device having a first end connected to a first breakdown diode and removably connected to the tip line, the first shunting device having a second end removably connected to a first inductor of the filter circuit;

b) a second shunting device having a first end connected to a second breakdown diode and removably connected to the ring line, the second shunting device having a second end removably connected to a second inductor of the filter circuit;

c) the first breakdown diode having a first lead connected to the first shunting device and a second lead removably connected to ground; and d) the second breakdown diode having a first lead connected to the second shunting device and a second lead removably connected to ground.

3. A modular balanced spectrum limiter for frequency filtering a balanced signal on a telephone system's tip and ring lines as defined by claim 2, wherein the first shunting device comprises a first resistive heating wire having a first end connected to a first breakdown diode and removably connected to the tip line, the first resistive heating wire having a second end removably connected to the first inductor, the first resistive heating wire arranged to short to ground upon reaching a predetermined temperature.

4. A modular balanced spectrum limiter for frequency filtering a balanced signal on a telephone system's tip and ring lines as defined by claim 2, wherein the second shunting device comprises a second resistive heating wire having a first end connected to a second breakdown diode and removably connected to the ring line, the second resistive heating wire having a second end removably connected to a second inductor of the filter circuit, the second resistive heating wire arranged to short to ground upon reaching a predetermined temperature.

5. A modular balanced spectrum limiter for frequency filtering a balanced signal on a telephone system's tip and ring lines as defined by claim 4, wherein the filter circuit comprises:

a) the first inductor wound around a first core;

b) the second inductor wound around the first core, the first and second inductors being formed by winding a pair of twisted wires around the first core, the first core being mounted on a filter holder; and c) a first capacitor connected between the first inductor and the second inductor.

6. A modular balanced spectrum limiter for frequency filtering a balanced signal on a telephone system's tip and ring lines as defined in claim 5, wherein the filter circuit further comprises:

a) a third inductor wound around a second core, the third inductor being connected between the first inductor and a tip output line; the third inductor having a first end connected to the first inductor and a second end removably connected to the tip output line;

b) a fourth inductor wound around the second core, the fourth inductor being connected between the second inductor and a ring output line; the fourth inductor having a first end connected to the second inductor and a second end removably connected to the ring output line, the second core mounted to the filter holder; and c) a second capacitor connected between the tip output line and the ring output line.

\* \* \* \* \*